United States Patent
Seima

(10) Patent No.: US 10,233,969 B2
(45) Date of Patent: Mar. 19, 2019

(54) HEAT RESISTANT STRUCTURE FOR SHAFT RETAINER, AND ACTUATOR

(71) Applicant: MITSUBISHI ELECTRIC CORPORATION, Tokyo (JP)

(72) Inventor: Nobuhiro Seima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/532,002

(22) PCT Filed: Feb. 23, 2015

(86) PCT No.: PCT/JP2015/055038
§ 371 (c)(1),
(2) Date: May 31, 2017

(87) PCT Pub. No.: WO2016/135825
PCT Pub. Date: Sep. 1, 2016

(65) Prior Publication Data
US 2017/0363145 A1    Dec. 21, 2017

(51) Int. Cl.
*F16C 29/02*    (2006.01)
*F16C 33/20*    (2006.01)
(Continued)

(52) U.S. Cl.
CPC .............. *F16C 29/02* (2013.01); *F16C 17/22* (2013.01); *F16C 33/125* (2013.01); *F16C 33/20* (2013.01); *F16C 33/205* (2013.01); *F16C 37/00* (2013.01); *F16J 15/162* (2013.01); *F16C 2202/20* (2013.01); *F16C 2208/10* (2013.01); *F16C 2300/54* (2013.01)

(58) Field of Classification Search
CPC ........ F16C 29/02; F16C 37/00; F16C 33/122; F16C 33/125; F16C 33/205; F16C 2208/10; F16C 17/22; F16C 33/20; F16C 2202/20; F16C 41/02; F16J 15/348
USPC ....... 384/125, 278–279, 261, 397, 441, 487, 384/275; 277/370, 392, 397, 590, 910
See application file for complete search history.

(56) References Cited

U.S. PATENT DOCUMENTS 2,683,637 A  *  7/1954  Skillman, Jr. ........... F16C 17/02
                                                    384/202
3,502,380 A  *  3/1970  Adinoff ................... F16C 33/20
                                                    384/299
(Continued)

FOREIGN PATENT DOCUMENTS

DE      3041335 A1  *  6/1982    ............. F02P 7/0677
EP      2913556 A4  *  3/2016    ............. F16C 33/74
(Continued)

OTHER PUBLICATIONS

Office Action dated Jul. 30, 2018 in corresponding Chinese Application No. 201580076311.9.

*Primary Examiner* — Marcus Charles
(74) *Attorney, Agent, or Firm* — Birch, Stewart, Kolasch & Birch, LLP

(57) ABSTRACT

A boss is provided around the periphery of a bushing that is penetrated by a shaft, which moves inside the bushing in the axial direction of the shaft. The boss retains the bushing and the shaft moving inside the bushing, and has a heat conductivity that is higher than that of the bushing. An air gap is provided between the bushing and the boss.

7 Claims, 3 Drawing Sheets

(51) Int. Cl.
*F16C 33/02* (2006.01)
*F16J 15/16* (2006.01)
*F16C 37/00* (2006.01)
*F16C 33/12* (2006.01)
*F16C 17/22* (2006.01)

(56) References Cited

U.S. PATENT DOCUMENTS

| | | | | | |
|---|---|---|---|---|---|
| 3,997,133 | A | * | 12/1976 | Fagan | B64C 25/60 188/375 |
| 4,301,691 | A | * | 11/1981 | Walter | B62D 5/22 180/428 |
| 4,478,137 | A | * | 10/1984 | Clark | F16D 65/22 277/346 |
| 4,558,837 | A | * | 12/1985 | Mens | B64C 25/00 244/104 FP |
| 4,710,036 | A | * | 12/1987 | Geczy | E21B 4/003 384/255 |
| 5,483,848 | A | * | 1/1996 | Rebordosa | A47J 43/085 74/355 |
| 6,176,147 | B1 | * | 1/2001 | Ozeki | B62D 5/12 180/417 |
| 6,644,430 | B2 | * | 11/2003 | Harer | B62D 5/22 180/417 |
| 8,205,515 | B2 | * | 6/2012 | Robertson | B62D 5/22 384/278 |
| 8,823,229 | B2 | * | 9/2014 | Brieschke | F16H 25/20 310/12.19 |
| 8,915,521 | B2 | * | 12/2014 | Cymbal | B62D 1/192 280/775 |
| 9,216,759 | B2 | * | 12/2015 | Kim | F16D 3/84 |
| 9,260,899 | B2 | * | 2/2016 | Loeffler | E05F 1/1041 |
| 2002/0098102 | A1 | * | 7/2002 | Gennami | F04C 29/028 418/55.4 |
| 2004/0026196 | A1 | * | 2/2004 | Huisman | B60G 3/01 188/322.16 |
| 2005/0218606 | A1 | * | 10/2005 | Sakazaki | F16J 15/064 277/627 |
| 2006/0219467 | A1 | * | 10/2006 | Damore | B62D 5/22 180/428 |
| 2007/0120374 | A1 | * | 5/2007 | Cotton | E05B 1/0092 292/66 |
| 2008/0237999 | A1 | * | 10/2008 | Mauceri | F16J 3/042 277/634 |
| 2010/0230907 | A1 | * | 9/2010 | Hatano | F16J 3/042 277/634 |
| 2011/0271793 | A1 | | 11/2011 | Hatano | |

FOREIGN PATENT DOCUMENTS

| | | | | |
|---|---|---|---|---|
| GB | 611121 | A | * 10/1948 | ............ D01H 7/041 |
| JP | 4-50777 | U | 4/1992 | |
| JP | 09068249 | A | * 3/1997 | ............... F16F 1/38 |
| JP | 2789999 | B2 | * 8/1998 | ............. B23P 19/02 |
| JP | 11-210707 | A | 8/1999 | |
| JP | 2007-236037 | A | 9/2007 | |
| WO | WO 2010/134125 | A1 | 11/2010 | |
| WO | WO-2010134125 | A1 | * 11/2010 | .......... F15B 15/1457 |

\* cited by examiner

HEAT RESISTANT STRUCTURE FOR SHAFT RETAINER, AND ACTUATOR

TECHNICAL FIELD

The present invention relates to a shaft retainer for retaining a shaft in such a manner that the shaft is movable in the axis direction of the shaft, and also to an actuator provided with such a shaft retainer.

BACKGROUND ART

A variety of mechanical configurations that retain a shaft in such a manner that the shaft is movable in the axis direction are known. Examples of the configurations include, e.g., a shaft retainer of a linear motion actuator. In a situation in which a shaft retainer of actuators is used under a relatively high temperature environment, heat that is transferred through the shaft retainer from the outside to the inside of the actuator or other devices may cause troubles in the operation of a driving part such as a motor or the like, or lead to loss of function of a component composed of a material with low heat-resistance capability, for example. Accordingly, various efforts have been made to prevent heat transfer from the outside to the inside of devices, including an actuator.

For example, Patent Document 1 discloses a technique for protecting a rubber boot, which seals a clearance between a shaft and a boss to prevent ingress of water, dust, and so on into the inside of the actuator, by using a heat shield cover having a bottomed cylindrical shape. With this cover, heat transfer to the inside of the actuator is mitigated to some extent.

CITATION LIST

Patent Document

Patent Document 1: International Publication Number WO 2010/134125

SUMMARY OF THE INVENTION

Problems to be Solved by the Invention

However, an actuator assembled in accordance with Patent Document 1 becomes large by the degree corresponding to the attached cover. Further, from the opening of the cover having a bottomed cylindrical shape, heat comes around to the inside of the cover, so that the heat that comes around eventually transfers to the inside of the actuator through the shaft retainer, including the boss.

Thus, according to the conventional art, it is difficult to provide a compact configuration for suppressing the heat transfer through the shaft retainer. Further, according to the conventional configuration as described above, it is difficult to suppress the heat transfer through the shaft retainer.

This invention has been made to solve the problems as described above, and an object thereof is to provide a heat resistant structure for a shaft retainer, and an actuator, which are compact and enhanced in heat-resistance capability.

Means for Solving the Problems

A heat resistant structure for a shaft retainer according to an aspect of the invention includes, a bushing having an interior through which a shaft penetrates and moves in the axis direction of the shaft, a boss arranged around the periphery of the bushing and retaining the bushing, with a heat conductivity higher than a heat conductivity of the bushing, and a heat insulating layer provided between the bushing and the boss.

Effect of the Invention

According to an aspect of the invention, because the boss having a heat conductivity higher than that of the bushing is provided around the periphery of the bushing, and the heat insulating layer is formed between the bushing and the boss, it is possible to enhance the heat-resistance capability of the shaft retainer with a compact configuration.

MODES FOR CARRYING OUT THE INVENTION

Hereinafter, embodiments for carrying out the invention will be described in accordance with the accompanying drawings in order to illustrate the invention in more detail.

Embodiment 1

Figure 1:
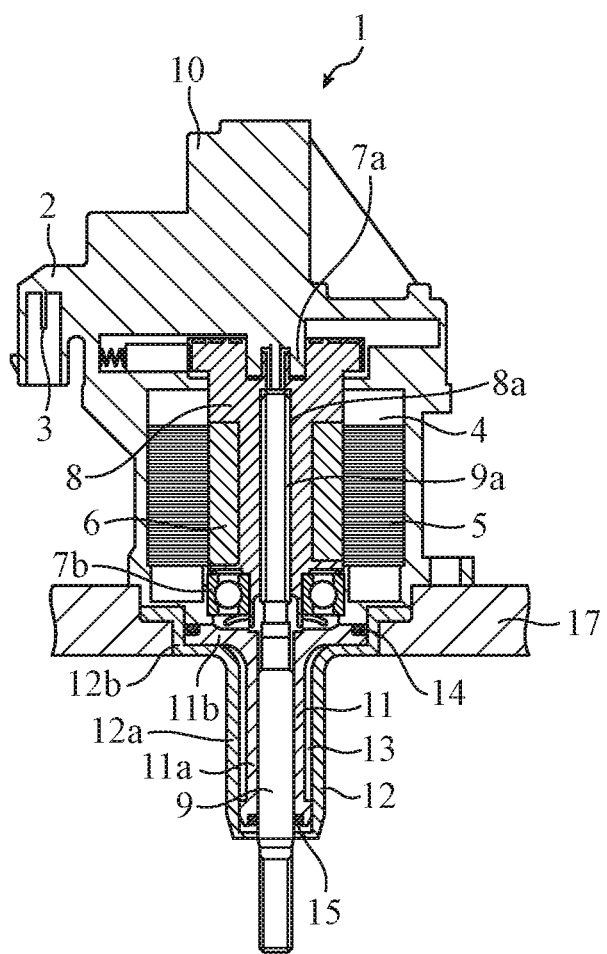
FIG. 1 is a cross-sectional view of an actuator according to Embodiment 1 of the invention.
Figure 2:
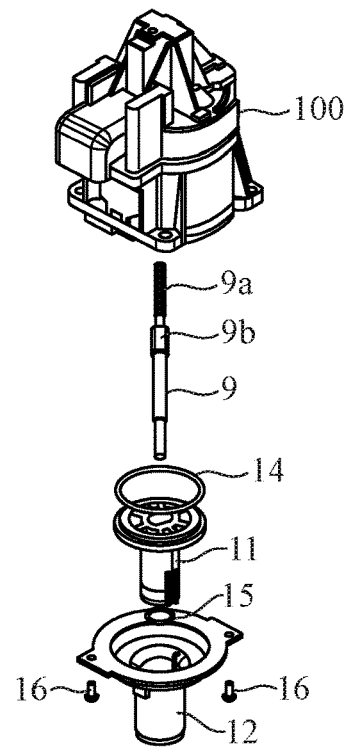
FIG. 2 is an exploded perspective view of the actuator according to Embodiment 1 of the invention.

FIG. 1 is a cross-sectional view of an actuator 1 provided with a heat resistant structure for a shaft retainer according to Embodiment 1 of the invention. FIG. 2 is an exploded perspective view of the actuator 1. Hereinafter, description will be made assuming that the actuator is one employing an electrically controlled motor, though another type of actuator, such as a pressure actuator, may be used.

By applying a voltage to a terminal 3 provided in an external input/output connector 2 of the actuator 1, an electric current flows in a coil 5 wound around a stator 4 to magnetize a plurality of poles of the stator 4 into an N or S pole. A substantially cylindrical rotor 8 includes an NS-magnetized magnet 6, and the upper and lower ends of the rotor 8 are retained respectively by a bushing 7a and a bearing 7b. In response to the NS magnetization of the stator 4, the rotor 8 rotates.

The interior of the rotor 8 is provided with a female screw as a screw mechanism 8a for converting a rotation into linear movement, while a shaft 9 is provided with a male screw as a screw mechanism 9a. The screw mechanism 8a engages the 9a screw mechanism. Further, on the shaft 9, a rotation stopper mechanism 9b for restraining a rotation of the shaft 9 is formed. The rotation stopper mechanism 9b makes surface contact with a flat portion formed on an inner circumferential surface of the bushing 11. With this configuration, a rotational movement of the rotor 8 is converted into a reciprocating movement of the shaft 9.

The external input/output connector 2, the terminal 3, the stator 4, the coil 5, the magnet 6, the bushing 7a, the bearing 7b, the rotor 8, and a motor housing 10 that houses these components constitute a motor part 100 shown in FIG. 2.

The bushing 11 is a substantially cylindrical member provided underneath the motor part 100 around the periphery of the shaft 9, and the shaft 9 penetrates the bushing 11. The shaft 9 moves in the axis direction while making contact with the inner circumferential surface of the bushing 11. Alternately, in order for the shaft 9 moves more smoothly in the axis direction, the shaft 9 may be configured to move without making contact with the inner circumferential surface of the bushing 11. In either case, the bushing 11 retains the shaft 9 in such a manner that the axis of the shaft 9 moves within an allowable range.

The busing 11 comprises a cylinder portion 11a and a flange 11b, and the flange 11b is extending from the end portion of the cylinder portion 11a that is close to the motor part 100. In order to suppress wearing of the shaft 9 in contact with the inner circumferential surface, the bushing 11 is made of, for example, resin.

Around the periphery of the bushing 11 there is provided a substantially cylindrical boss 12 for retaining the bushing 11. The boss 12 comprises a cylinder portion 12a and a flange 12b, and the flange 12b is extending from the end portion of the cylinder portion 12a that is close to the motor part 100. An end portion of the shaft 9 protrudes from the bottom face of the cylinder portion 12a. The boss 12 is formed from a material with high-strength such as a metal, including aluminum, to ensure that the boss 12 can retain the bushing 11 and the shaft 9 moving in the axis direction within the bushing 11 even if the boss 12 is made compact.

The outer diameter of the cylinder portion 11a of the bushing 11 is smaller, at almost all portions thereof, than the inner diameter of the cylinder portion 12a of the boss 12, so that an air gap 13 is formed between the cylinder portion 12a and the cylinder portion 11a.

A seal member 14 is sandwiched between the motor housing 10 and the flange 11b of the bushing 11. Further, a seal member 15 is sandwiched between an outer circumferential surface of the shaft 9 and an inner circumferential surface of the bushing 11. The seal member 15 is provided at the lower end portion of the bushing 11 and has a sealing function for preventing water, dust and the like from intruding into the inside of the actuator 1 through the clearance between the shaft 9 and the bushing 11. The seal members 14, 15 are each formed of a rubber O-ring, for example.

The bushing 11 to which the seal members 14, 15 are attached is press-fitted into the boss 12. The boss 12 into which the bushing 11 is press-fitted is attached to the motor housing 10 by, for example, using screws 16. Note that, instead of using the seal member 14, the bushing 11 may be ultrasonically welded to the motor housing 10.

The bushing 11, the boss 12, the air gap 13 and/or the seal member 15 constitute a shaft retainer.

The actuator 1 configured in this manner is attached to a housing 17 for fixing the actuator 1 by using, for example, screws, and is used, for example, to open or close an unshown waste gate valve for splitting the flow of an exhaust gas flowing into an unshown turbo-charger. In this case, the motor part 100 side of the actuator 1 is placed toward an unshown turbo compressor with a low temperature, and the bushing 11 and the boss 12 are placed toward an unshown turbo turbine with a high temperature. Namely, the surrounding temperature becomes higher as a position on FIG. 1 goes down. The housing 17 has a thickness such that the portion to which the actuator 1 is attached can keep its strength, and therefore the housing 17 is a member with a large thermal capacity, accordingly.

Figure 3:
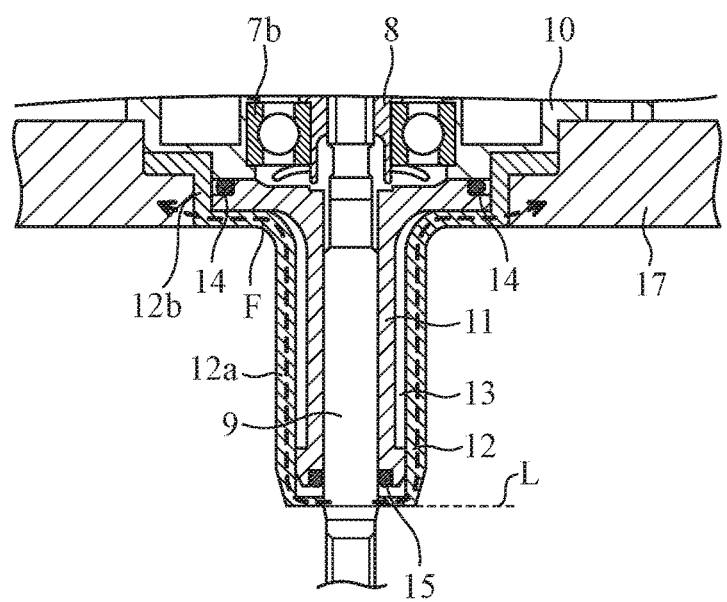
FIG. 3 is a partially enlarged view of FIG. 1.

Here, an enlarged view of a portion including the bushing 11 and the boss 12 of the actuator 1 is shown in FIG. 3. As already described, the bushing 11 is made of resin and is thus formed as a member with a low heat conductivity. In contrast, the boss 12 placed around the periphery of the bushing 11 is made of aluminum, for example, and is thus formed as a member with a heat conductivity higher than that of the bushing 11. This configuration allows the heat from the unshown turbo-turbine side, received by the actuator 1 at the lower end portion of the cylinder portion 12a, to be conducted toward the flange 12b within the boss 12, and dissipated to the housing 17 that the flange 12b is in contact with, as indicated by a flow F in FIG. 3. Further, the air gap 13 formed between the bushing 11 and the boss 12 suppresses the heat transfer from the boss 12 toward the bushing 11.

Thus, because of the heat dissipation capability of the boss 12 and the heat insulation capability of the air gap 13, it is possible to suppress the external heat from transferring to the inside of the actuator 1, and also to protect the bushing 11 made of resin and the seal member 15 made of rubber, which are easily affected by heat. Therefore, according to Embodiment 1, it is possible to make the operation of the motor part 100 stable, and the heat-resistance capability of the shaft retainer is enhanced such that its function of supporting the shaft 9 and its sealing function by the seal member 15 can be ensured even under a high temperature environment.

Further, unlike the conventional technique, it is unnecessary to provide a cover that encloses the shaft retainer, including the boss. Accordingly, the heat resistant structure can be constructed compactly.

In addition to the advantages above, improvement in the heat-resistance capability allows the actuator 1 to be placed closer to a high temperature source, such as the turbo-turbine or the like. Accordingly, the layout flexibility of the actuator 1 is enhanced, and the arrangement space can be saved. Further, in the case of the configuration in which the cover that encloses a shaft retainer, including a boss, is provided as in the conventional case, because the cover moves together with the shaft, it is necessary to ensure such a degree of space that allows the cover to move smoothly; however, when the actuator is configured as in Embodiment 1 shown in FIG. 1 to FIG. 3, it is unnecessary to ensure such a space.

Figure 4:
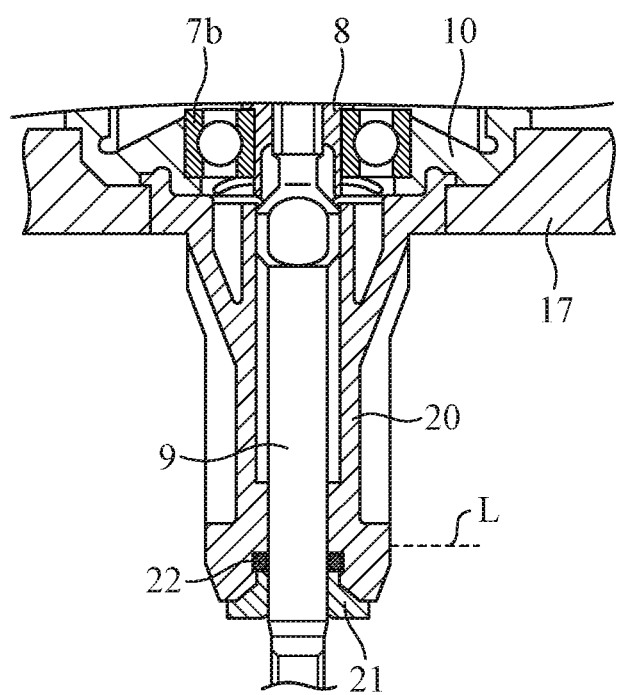
FIG. 4 is a cross-sectional view showing a comparison example which provides an aid in understanding a heat resistant structure illustrated in FIG. 3.

Further, for the sake of comparison with Embodiment 1, a comparison example is shown in FIG. 4 to provide an aid in understanding of the present invention. In FIG. 4, with respect to the parts that are the same as or equivalent to those in FIG. 3, the same reference numerals are given thereto. Note that a boss 20 to be described later is ultrasonically welded to the motor housing 10. Further, in the comparison example shown in FIG. 4, the shaft 9 reciprocates according to the same principle of operation described using FIG. 1 and FIG. 2 for the motor part 100.

In FIG. 4, the substantially cylindrical boss 20 is provided around the periphery of the shaft 9, underneath which a plate 21 is attached that is formed with a through-hole for allowing the shaft 9 to penetrate therethrough. The boss 20 retains the shaft 9 to be movable in its axis direction, and a rubber seal member 22 is sandwiched between the shaft 9 and the boss 20 to have a sealing function. For the boss 20 and the plate 21, such a resin material is used that can be configured in any shape and is low in cost. The boss 20, the plate 21 and the seal member 22 are easily affected by heat, so that the configuration shown in FIG. 4 has to be placed away from the high temperature source such as the turbo-turbine or the like, and thus a need arises to ensure a sufficient arrangement space. In addition, the resin is low in strength under a high temperature environment, so that, in order to ensure such a degree of strength that can support the shaft 9 even under the high temperature environment, the boss 20 and the plate 21 that are made of resin have to be formed to be large, resulting in the big boss 20 and plate 21.

In contrast to the comparison example shown in FIG. 4, according to the configuration shown in Embodiment 1, the bushing 11, even though made of resin, is less likely to reach a high temperature, so that it is not required to be formed to be as large as the boss 20, and further, the boss 12 is not required to be made larger because the boss 12 is made of high-strength metal. Thus, the boss 12 and the bushing 11 can be made more compact than the boss 20 and the plate 21, also as a whole. Accordingly, it is understood that, in the case where the configurations of Embodiment 1 and the comparison example are used under the same environment, as shown in FIG. 3 and FIG. 4 for example, the shaft retainer of Embodiment 1 can be made more compact, so that the lower end line L of the boss 12 is placed higher than the lower end of the plate 21.

It is noted that, although in Embodiment 1, the bushing 11 is merely described as it is made of resin, it is conceivable to specifically use as that resin, for example, a polyphenylene sulfide, a polyphenylene sulfide mixed with glass fibers, a polyphenylene sulfide mixed with carbon, or the like. Further, the bushing 11 may be made of carbon.

Further, although the boss 12 is described as it is made of metal, and made of aluminum as an example, it may be formed of magnesium, copper or the like; a key is to make the boss 12 by using a material whose heat conductivity is higher than that of the bushing 11.

Further, although in Embodiment 1, the air gap 13 is formed between the bushing 11 and the boss 12, a heat insulating member may be filled between the bushing 11 and the boss 12. As the heat insulating member, it is conceivable to use, for example, any one of variety of foamed members, a glass wool, a rubber, or the like. Instead, a space provided between the bushing 11 and the boss 12 may be made vacuum after the airtightness of the space is ensured, to thereby establish a vacuum layer in place of the air gap 13. In essence, it suffices that the clearance between the bushing 11 and the boss 12 can serve as a heat insulating layer.

Further, in Embodiment 1, such a case is described in which the heat resistant structure for the shaft retainer is provided as a part of the actuator 1. However, the heat resistant structure for the shaft retainer may be applied to any device that has a shaft retainer for retaining a shaft to be movable in its axis direction, and requires heat-resistance capability. Thus, the structure may be provided as a unit which is separate from an object device to which the structure is applied.

As described above, in accordance with the heat resistant structure for a shaft retainer according to Embodiment 1, around the periphery of the bushing 11 through which the shaft 9 penetrates and moves in the axis direction, the boss 12 is provided in such a manner that the air gap 13 is provided between the bushing 11 and the boss 12, the boss 12 retaining the bushing 11 and the shaft 9 moving inside the bushing 11, and having a heat conductivity that is higher than that of the bushing 11. This makes it possible to enhance the heat-resistance capability of the shaft retainer with a compact configuration. Further, when such a heat resistant structure for the shaft retainer is applied to an actuator, the actuator can be provided to be compact and high in heat-resistance capability.

Further, the boss 12 makes contact with the housing serving as a heat dissipation member. Thus, heat dissipation by the boss 12 is promoted.

Further, the boss 12 is made of metal. Thus, its sufficient strength can be ensured.

Further, the bushing 11 is made of resin. Thus, the wearing of the shaft 9 at the time the shaft 9 makes contact with the inner circumferential surface of the bushing 11 is suppressed. In addition, the bushing 11 can be easily shaped into any shape, and can also achieve cost reduction. Further, because the shaft retainer has heat-resistance capability, the function of the bushing 11 is maintained even under a high temperature environment.

Further, the heat insulating layer is embodied as the air gap 13. Thus, a heat insulating layer with high heat-insulation capability can be provided easily.

Further, the seal member 15 is provided to be sandwiched between the outer circumferential surface of the shaft 9 and the inner circumferential surface of the bushing 11. Thus, it is possible to prevent water, dust and the like from intruding through the clearance between the shaft 9 and the bushing 11. Further, because the shaft retainer has heat-resistance capability, the function of the seal member 15 is maintained even under a high temperature environment.

Furthermore, modification or omission of parts of embodiments described above may be made within the scope of the invention.

INDUSTRIAL APPLICABILITY

As described above, the heat resistant structure for a shaft retainer according to the invention can properly support the shaft even under a high temperature environment, and can also reduce heat transfer to the inside of the shaft retainer. Thus, it is suited to be used as a structure for retaining, for example, a shaft of an actuator placed under a high temperature environment, to be movable in its axis direction.

DESCRIPTION OF REFERENCE NUMERALS AND SIGNS

1: actuator, 2: external input/output connector, 3: terminal, 4: stator, 5: coil, 6: magnet, 7a: bushing, 7b: bearing, 8: rotor, 8a: screw mechanism, 9: shaft, 9a: screw mechanism, 9b: rotation stopper mechanism, 10: motor housing, 11: bushing, 11a: cylinder portion, 11b: flange, 12: boss, 12a: cylinder portion, 12b: flange, 13: air gap, 14 and 15: seal member, 16: screws, 17: housing, 20: boss, 21: plate, 22: seal member, 100: motor part.

The invention claimed is:
1. A heat resistant structure for a shaft retainer, the structure comprising:
a bushing having an interior through which a shaft penetrates and moves in the axis direction of the shaft;
a boss arranged around the periphery of the bushing and retaining the bushing, with a heat conductivity higher than a heat conductivity of the bushing; and
a heat insulating layer provided between the bushing and the boss,
wherein the boss is configured to make contact with the shaft.
2. The heat resistant structure for a shaft retainer according to claim 1, wherein the boss makes contact with a heat dissipation member.
3. The heat resistant structure for a shaft retainer according to claim 1, wherein the boss is made of metal.

4. The heat resistant structure for a shaft retainer according to claim 1, wherein the bushing is made of resin.

5. The heat resistant structure for a shaft retainer according to claim 1, wherein the heat insulating layer comprises an air gap.

6. The heat resistant structure for a shaft retainer according to claim 1, comprising a seal member to be sandwiched between an inner circumferential surface of the bushing and an outer circumferential surface of the shaft.

7. An actuator comprising:
- a heat resistant structure for a shaft retainer, the structure comprising:
  - a bushing having an interior through which a shaft penetrates and moves in the axis direction of the shaft;
  - a boss arranged around the periphery of the bushing and retaining the bushing, with a heat conductivity higher than a heat conductivity of the bushing; and
  - a heat insulating layer provided between the bushing and the boss,
- wherein the boss is configured to make contact with the shaft.

* * * * *